United States Patent [19]
Yahagi et al.

[11] Patent Number: 5,329,805
[45] Date of Patent: Jul. 19, 1994

[54] VEHICLE BODY SPEED ESTIMATING METHOD IN ANTI-LOCK CONTROL SYSTEM FOR VEHICLE

[75] Inventors: Toshio Yahagi; Yoshihiro Iwagawa; Yoichi Sugimoto; Tsuyoshi Satoh; Takeshi Kojima, all of Saitama, Japan

[73] Assignee: Honda Giken Kogyo Kabushiki Kaisha, Tokyo, Japan

[21] Appl. No.: 828,297

[22] Filed: Jan. 30, 1992

Related U.S. Application Data

[63] Continuation-in-part of Ser. No. 648,330, Jan. 30, 1991, Pat. No. 5,109,694, which is a continuation of Ser. No. 381,422, Jul. 18, 1989, abandoned.

[30] Foreign Application Priority Data

Jul. 18, 1988 [JP] Japan ................. 63-178368
Oct. 18, 1991 [JP] Japan ................. 3-271205

[51] Int. Cl.$^5$ .......................................... G01N 19/02
[52] U.S. Cl. .................................. 73/9; 364/426.02
[58] Field of Search ......................... 73/118.1, 9; 364/426.02; 303/102, 103, 109

[56] References Cited

U.S. PATENT DOCUMENTS 4,848,851 7/1989 Kutaoka et al. ............... 303/109
4,985,836 1/1991 Hashiguchi et al. ........... 364/426.02
5,157,611 10/1992 Ikeda et al. .................... 364/426.02
5,185,702 2/1993 Okubo ............................ 303/103
5,200,897 4/1993 Makino et al. ................ 303/92

FOREIGN PATENT DOCUMENTS

DE3923782A1 1/1990 Fed. Rep. of Germany.
DE3924448A1 2/1990 Fed. Rep. of Germany.
DE3905045A1 8/1990 Fed. Rep. of Germany.
GB2221758B 2/1990 Great Britain.

Primary Examiner—Robert Raevis
Attorney, Agent, or Firm—Armstrong, Westerman, Hattori, McLeland & Naughton

[57] ABSTRACT

A first vehicle body speed is calculated based on a wheel rotational speed detected in a speed sensor for an object wheel. The largest value of speeds based on the wheel rotational speeds detected in speed sensors for four wheels is corrected by a correction value based on an inner and outer wheel speed difference during the turning of a vehicle so as to calculate a second vehicle body speed for every object wheel. A higher one of the first and second vehicle body speeds is selected as an estimated vehicle body speed for use in the anti-lock control for the object wheel. This enables a substantially accurate estimation of an estimated vehicle body speed during the turning of the vehicle.

11 Claims, 6 Drawing Sheets

VEHICLE BODY SPEED ESTIMATING METHOD IN ANTI-LOCK CONTROL SYSTEM FOR VEHICLE

This is continuation in part of Ser. No. 648,330, filed Jan. 30, 1991, U.S. Pat. No. 5,109,694, which is a continuation of Ser. No. 381,422, Jul. 18, 1989, now abandoned.

BACKGROUND OF THE INVENTION

1. FIELD OF THE INVENTION

The present invention is a continuation-in-part of application Ser. No. 648,330, filed Jan. 30, 1991, now U.S. Pat. No. 5,109,694, in turn, a continuation of application Ser. No. 381,422, filed Jul. 18, 1989, now abandoned, and is directed to methods for estimating the vehicle body speed, on which a slip rate is based, for an anti-lock control system for a vehicle. The anti-lock control system operates by controlling the braking pressure for the wheels by estimating a vehicle body speed based on a wheel rotational speed detected in a speed sensor and by determining the slip rate of the wheels based on the estimated vehicle body speed.

2. DESCRIPTION OF THE PRIOR ART

Conventionally, anti-lock control of an object wheel is effected by estimating a vehicle body speed from a rotational speed of the object wheel and by determining a slip rate from a comparison of the rotational speed of the object wheel with a reference wheel rotational speed determined by the estimated vehicle body speed. Such a conventional system has been disclosed in Japanese Laid-open Patent Application Nos. 41237/82 and 60984/82.

During braking in a vehicle provided with an anti-lock control system that is travelling on a straight road, a wheel rotational speed which is the highest speed of the four front and rear wheels is a value closest to a vehicle body speed, during both anti-lock control and non-antilock control. During braking when the vehicle is turning, however, a large speed difference is produced between the highest one of the four-wheel rotational speeds and the other wheel rotational speeds due to a difference in speed between inner and outer wheels or between left and right wheels. Hence, if the vehicle body speed is estimated on the basis of the highest speed, without taking into account the turning action of the vehicle the reference wheel rotational speed determined from the estimated vehicle body speed to set the slip rate is higher than necessary. As a result, anti-lock control is carried out even though such control is not required.

SUMMARY OF THE INVENTION

Accordingly, it is an object of the present invention to provide a method for estimating the vehicle body speed in an anti-lock control system for a vehicle. This method is designed to provide a more accurate estimation of the vehicle body speed during the turning of the vehicle.

To achieve the above object, according to the present invention, there is provided a method for estimating a vehicle body speed in an anti-lock control system of a vehicle that controls the braking pressure for the wheels by estimating the vehicle body speed based on a wheel rotational speed detected in a speed sensor and by determining a slip rate of the wheel based on the estimated vehicle body speed. The method incorporates the steps of calculating a first vehicle body speed based on a wheel rotational speed detected in a speed sensor for an object wheel; correcting the largest value of the speeds based on the wheel rotational speeds detected in speed sensors for all of the wheels by a correction value based on a difference in speed between the inner and outer wheels during the turning of the vehicle to calculate a second vehicle body speed for every object wheel; and selecting the higher one of the first and second vehicle body speeds as an estimated vehicle body speed for use in the anti-lock control for the object wheel.

According to another aspect of the present invention, the method comprises calculating a first vehicle body speed based on a wheel rotational speed detected in a speed sensor for an object wheel, selecting the lower one of the speeds determined from wheel rotational speeds detected in speed sensors for the left and right driving wheels which are interconnected substantially rigidly, selecting the higher one of the speeds determined from wheel rotational speeds detected in speed sensors for left and right follower wheels, correcting the higher one of these selected speed values by a correction value based on a difference in speed between the inner and outer wheels during the turning of the vehicle so as to calculate a second vehicle body speed for every object wheel, and selecting the higher one of the first and second vehicle body speeds as an estimated vehicle body speed for use in the anti-lock control of each object wheel. Such a method ensures that the wheel speeds of the left and right driving wheels are substantially synchronous and hence, the phases of the left and right driving wheels cannot be misaligned due to the anti-lock control during the turning of the vehicle. Thus, even if a lower value of the driving-wheel speeds is employed, the estimated vehicle body speed is prevented from being largely deviated from an actual vehicle body speed.

The above and other objects, features and advantages of the invention will become apparent from a consideration of the following description of the preferred embodiments, taken in conjunction with the accompanying drawings.

BRIEF DESCRIPTION OF THE DRAWINGS

FIGS. 1 to 4 illustrate a first embodiment of the present invention, wherein

FIG. 1 is a block diagram illustrating the whole of an arrangement for estimating a vehicle body speed;

FIGS. 2 and 3 are graphs each illustrating a correcting value determination characteristic during the turning of a vehicle; and FIG. 4 is a graph illustrating one example of wheel speed characteristics during independent anti-lock control of each of the left and right wheels;

FIGS. 6 to 8 illustrate a third embodiment of the present invention, wherein

FIG. 6 is a block diagram illustrating an arrangement for estimating a vehicle body speed;

FIG. 7 is a graph Illustrating a relationship between the wheel rotational speed and the first vehicle body speed; and FIG. 8 is a block diagram illustrating an arrangement of a turning correction means.

DESCRIPTION OF THE PREFERRED EMBODIMENTS

The present invention will now be described by way of its preferred embodiments in connection with the accompanying drawings.

Figure 1:
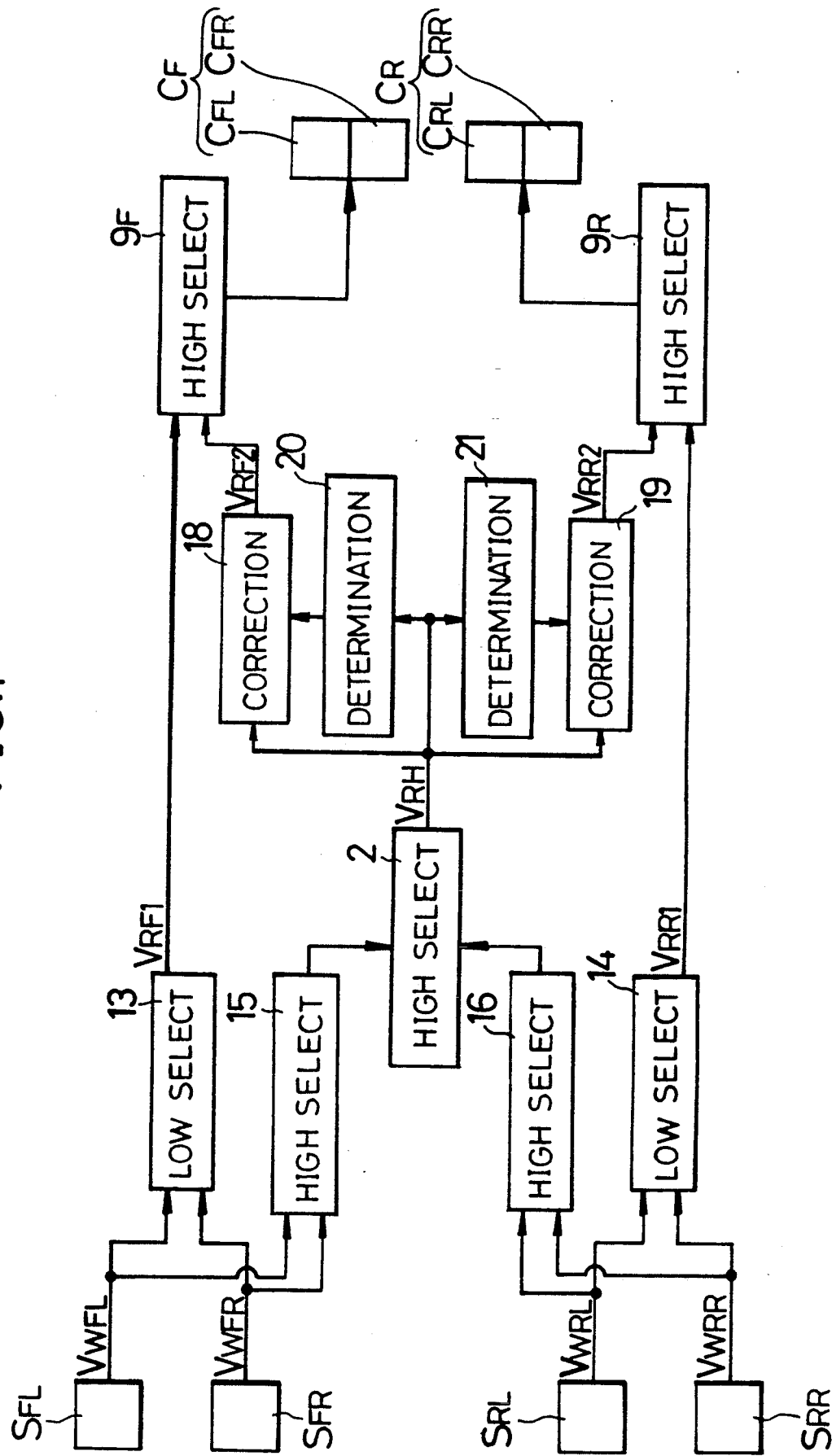

A first embodiment of the present invention will be described with reference to FIGS. 1 to 4. Referring first to FIG. 1, the hydraulic braking pressure for each of the front wheel brakes mounted on opposite front wheels of a vehicle is controlled by an anti-lock control circuit $C_F$ when a corresponding front wheel is about to become locked. The hydraulic braking pressure for each of rear wheel brakes mounted on opposite rear wheels of the vehicle is controlled by an anti-lock control circuit $C_R$ when a corresponding rear wheel is about to become locked. Specifically, each of the anti-lock control circuits $C_F$ and $C_R$ comprises control sections $C_{FL}$ and $C_{FR}$, and $C_{RL}$ and $C_{RR}$, respectively, which independently correspond to the left and right wheels. In each of the control sections $C_{FL}$, $C_{FR}$, $C_{RL}$ and $C_{RR}$, an anti-lock control for the corresponding wheel brake is started when a slip rate exceeds an acceptable value. This occurs when the speed of a corresponding wheel speed becomes equal to or less than a reference wheel speed.

The reference wheel speed is obtained by multiplication of an estimated vehicle body speed by a given slip rate. A vehicle body speed estimated on the basis of the front wheel speeds is received into the anti-lock control circuit $C_F$, and a vehicle body speed estimated on the basis of the rear wheel speeds is received into the anti-lock control circuit $C_R$.

For such an estimation of the vehicle body speed, speed sensors $S_{FL}$ and $S_{FR}$ are mounted on the left and right front wheels, respectively, and speed sensors $S_{RL}$ and $S_{RR}$ are mounted on the left and right rear wheels, respectively. Front wheel speeds $V_{WFL}$ and $V_{WFR}$ provided by the speed sensors $S_{FL}$ and $S_{FR}$ are received into a low select circuit 13, and rear wheel speeds $V_{WRL}$ and $V_{WRR}$ provided by the speed sensors $S_{RL}$ and $S_{RR}$ are received into a low select circuit 14.

In the low select circuit 13, the lower one of the received front wheel speeds $V_{WFL}$ and $V_{WFR}$ is selected as a first front wheel-side vehicle body speed $V_{RF1}$, and in the low select circuit 14, the lower one of the received rear wheel speeds $V_{WRL}$ and $V_{WRR}$ is selected as a first rear wheel-side vehicle body speed $V_{RR1}$. The first wheel speeds $V_{RF1}$ and $V_{RR1}$ provided by the selection in such low select circuits 13 and 14 are supplied to high select circuits $9_F$ and $9_R$, respectively.

The front wheel speeds $V_{WFL}$ and $V_{WFR}$ provided in the speed sensors $S_{FL}$ and $S_{FR}$ are also supplied to a high select circuit 15, and the rear wheel speeds $V_{WRL}$ and $V_{WRR}$ provided by the speed sensors $S_{RL}$ and $S_{RR}$ are also supplied to a high select circuit 16. The high select circuits 15 and 16 are connected to a high select circuit 2. Thus, the highest one $V_{RH}$ of the four-wheel speeds of the vehicle is selected in the high select circuit 2.

The wheel speed $V_{RH}$ selected in the high select circuit 2 is received into correction circuits 18 and 19 and also into determination circuits 20 and 21. The correction circuits 18 and 19 are adapted to correct the wheel speed $V_{RH}$ on the basis of a difference between inner and outer wheel speeds produced during turning of the vehicle. In the correction circuit 18, a second vehicle body speed $V_{RF2}$ is calculated according to the following expression (1), and in the correction circuit 19, a second vehicle body speed $V_{RR2}$ is calculated according to the following expression (2):

$$V_{RF2} = V_{RH} - \Delta V_F \quad (1)$$
$$V_{RR2} = V_{RH} - \Delta V_R \quad (2)$$

Figure 2:
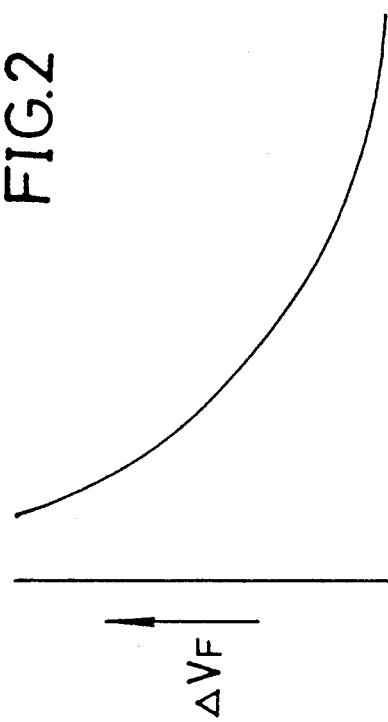
Figure 3:
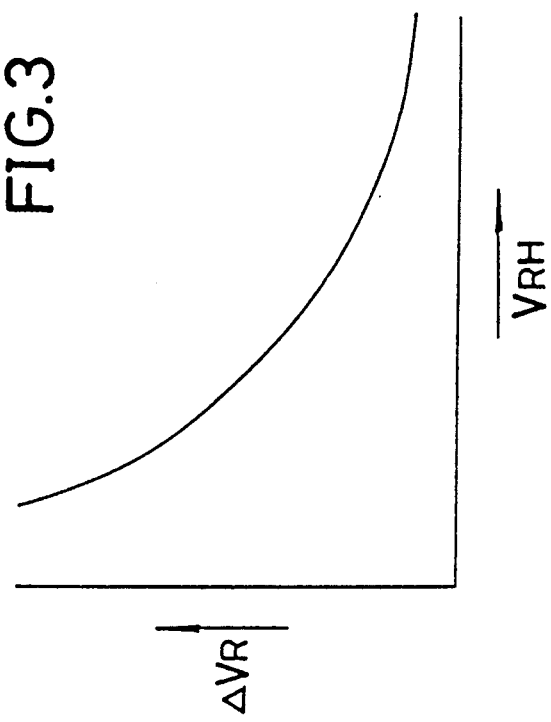

$\Delta V_F$ and $\Delta V_R$ in the expressions (1) and (2) are correction values for correcting the difference between the inner and outer wheel speeds produced during turning of the vehicle, respectively and are supplied from the determination circuits 20 and 21 to the correction circuits 18 and 19, respectively. In other words, in the determination circuit 20, the correction value $\Delta V_F$ is determined as shown in FIG. 2, in accordance with an index representative of a vehicle travel speed, e.g., the wheel speed $V_{RH}$, on the basis of the fact that a minimum radius of turning of the vehicle is determined by the vehicle travel speed. In the determination circuit 21, the correction value $\Delta V_R$ is determined as shown in FIG. 3 in accordance with the wheel speed $V_{RH}$.

The second vehicle body speed $V_{RF2}$ provided in the correction circuit 18 is received to the high select circuit $9_F$ where higher one of the first and second vehicle body speeds $V_{RF1}$ and $V_{RF2}$ is selected as an estimated vehicle body speed $V_{RF}$ which is supplied to the anti-lock control circuit $C_F$. The second vehicle body speeds $V_{RR2}$ provided in the correction circuit 19 is supplied to the high select circuit $9_R$ where higher one of the first and second vehicle body speeds $V_{RR'}$, and $V_{RR2}$ is selected as an estimated vehicle body speed $V_{RR}$ which is supplied to the anti-lock control circuit $C_R$.

The operation of the first embodiment will be described below. front wheel-side vehicle body speed $V_{RF}$ is estimated on the basis of a higher value selected from a lower selected value $V_{RF'}$, of the front wheel speeds $V_{WFL}$ and $V_{WFR}$ and a value $V_{RF2}$ provided by correction of the highest selected value $V_{RH}$ Of the speeds of the four front and rear wheels on the basis of the difference between the inner and outer wheel speeds produced during turning of the vehicle, and a rear wheel-side vehicle body speed $V_{RR}$ is estimated on the basis of a higher value selected from a lower selected value $V_{RR'}$, of the front wheel speeds $V_{WRL}$ and $V_{WRR}$ and a value $V_{RR2}$ provided by correction of the highest selected value $V_{RH}$ Of the speeds of the four front and rear wheels on the basis of the difference between the inner and outer wheel speeds produced during turning of the vehicle. A slip rate is judged by comparison of reference wheel speeds determined by the estimated vehicle body speeds $V_{RF}$ and $V_{RR}$ with each of the wheel speeds, thereby effecting an anti-lock control.

Therefore, during braking in the middle of turning movement of the vehicle, the reference wheel speeds based on the vehicle body speeds can not be determined as being too high. This avoids that the slip rate of the wheel is estimated unnecessarily high on the basis of difference between the inner and outer wheel speeds, thereby preventing the start of an unnecessary anti-lock control.

Figure 4:
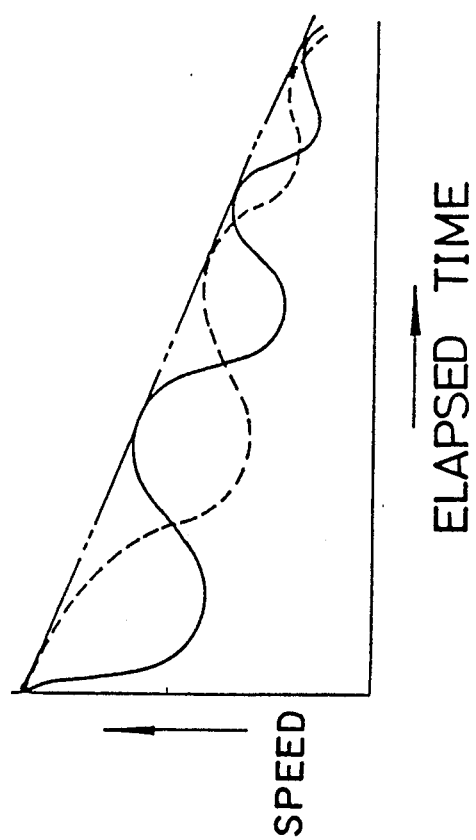

Moreover, even if a misalignment in phases is produced between the left and right wheels, as shown by broken and solid lines in FIG. 4, due to the anti-lock controls independent for left and right wheels during braking when the vehicle is turning, it is possible to provide an estimated vehicle body speed approximating to an actual vehicle body speed.

In an alternative embodiment, a lateral acceleration of the vehicle may be detected, and the lateral acceleration and a wheel speed $V_{RH}$ representative of travel speeds may be supplied to the determination circuits 20 and 21 shown in FIG. 1, where correction values $\Delta V_F$ and $\Delta V_R$ may be determined in accordance with the lateral acceleration and the wheel speed $V_{RH}$. In addition, a steering amount may be detected, and correction values $\Delta V_F$ and $\Delta V_R$ may be determined in accordance with the steering amount.

Figure 5:
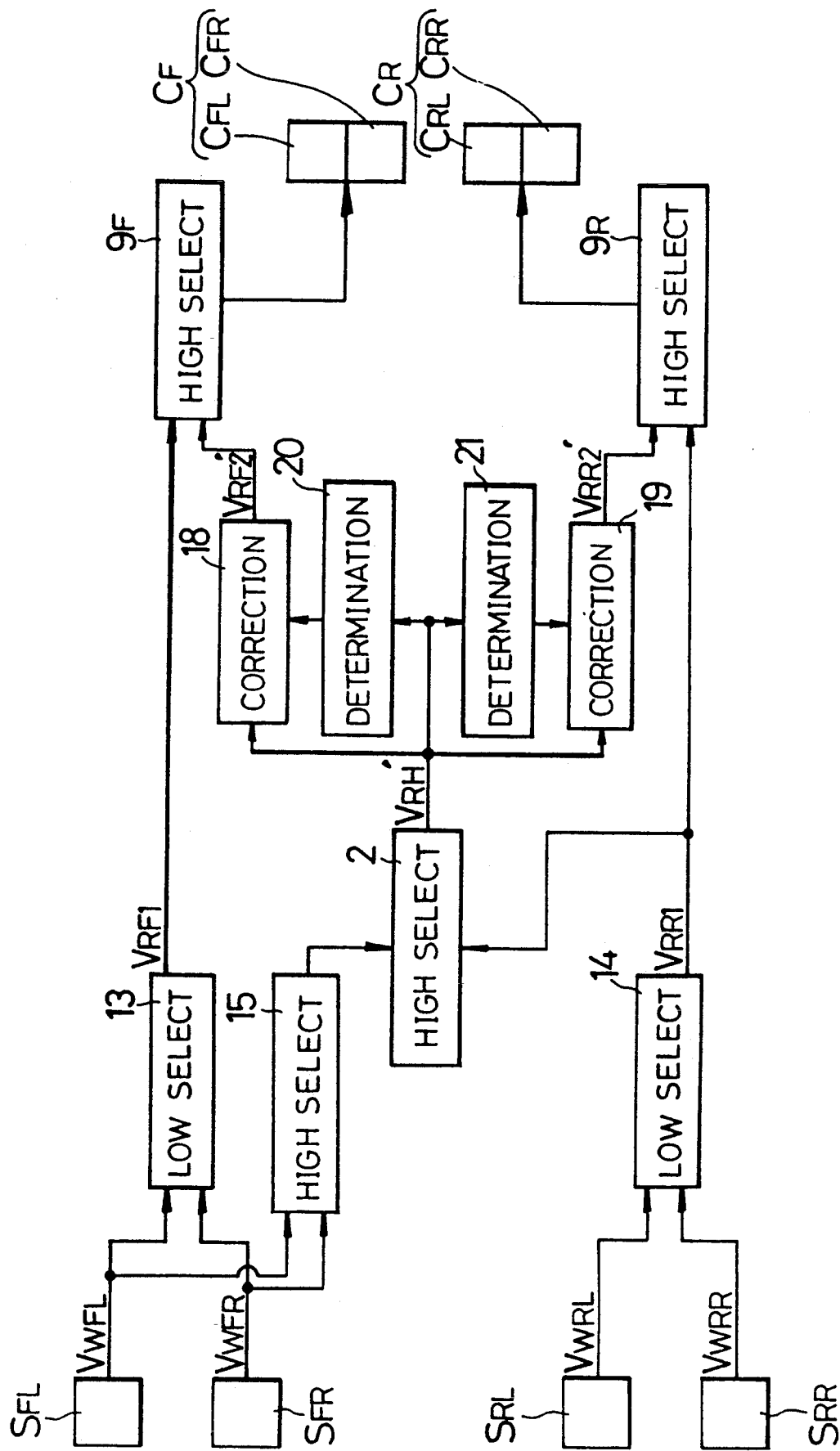
FIG. 5 is a block diagram illustrating the whole of an arrangement for estimating a vehicle body speed according to a second embodiment.

FIG. 5 illustrates a second embodiment of the present invention, wherein parts or components corresponding to those in the first embodiment are designated by like reference numerals characters.

The second embodiment is similar to the embodiment shown in FIG. 1, wherein left and right rear wheels which are driving wheels are connected substantially rigidly, for example, by a viscous coupling. It is noticeable that rear wheel speeds $V_{WRL}$ and $V_{WRR}$ provided in the speed sensors $S_{RL}$ and $S_{RR}$ are supplied to the low select circuit 14, and a lower value $V_{RR1}$ selected in the circuit 14 is supplied to the high select circuit 2 and also to the high select circuit $9_R$. The other parts or components are constructed in a similar manner to FIG. 1.

More specifically, higher one of a first vehicle body speed $V_{RF1}$ and a second vehicle body speed $V_{RR2}'$ provided by correction of a speed $V_{RH}'$ provided in the high select circuit 2 on the basis of the difference between the inner and outer wheel speeds produced during turning of the vehicle is selected as an estimated front wheel-side vehicle body speed, and higher one of the first vehicle body speed $V_{RR1}$ and a second vehicle body speed $V_{RR2}'$ provided by correction of a value $V_{RH}'$ provided in the high select circuit 2 on the basis of the inner and outer wheel differences produced during turning of the vehicle is selected as an estimated rear wheel-side vehicle body speed.

In this way, when the rear wheels which are the left and right driving wheels are connected substantially rigidly, the speeds $V_{WRL}$ and $V_{WRR}$ of the left and right wheels are substantially equal to each other, and there is not a substantial difference, even if either a higher or lower value of the speeds $V_{WRL}$ and $V_{WRR}$ is employed. Therefore, the second embodiment has basically the same arrangement as the first embodiment shown in FIG. 1 and provides an effect similar to that in the first embodiment.

Figure 6:
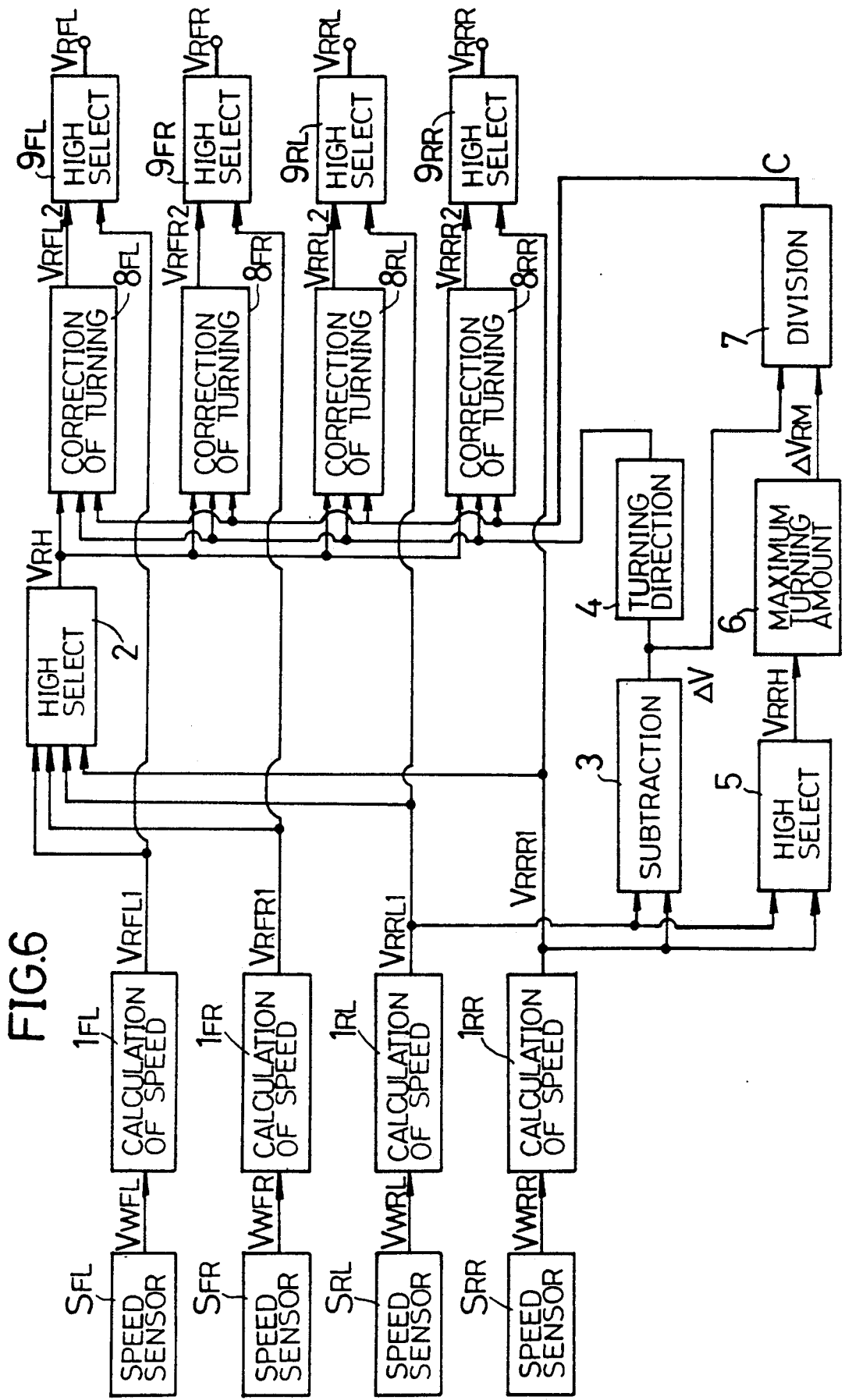
Figure 7:
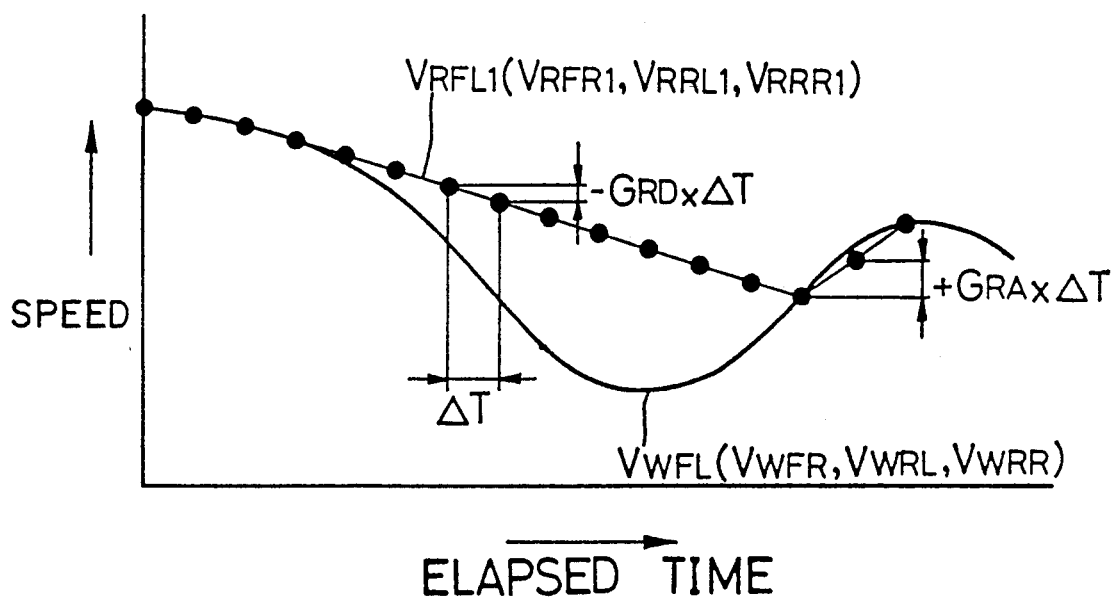
Figure 8:
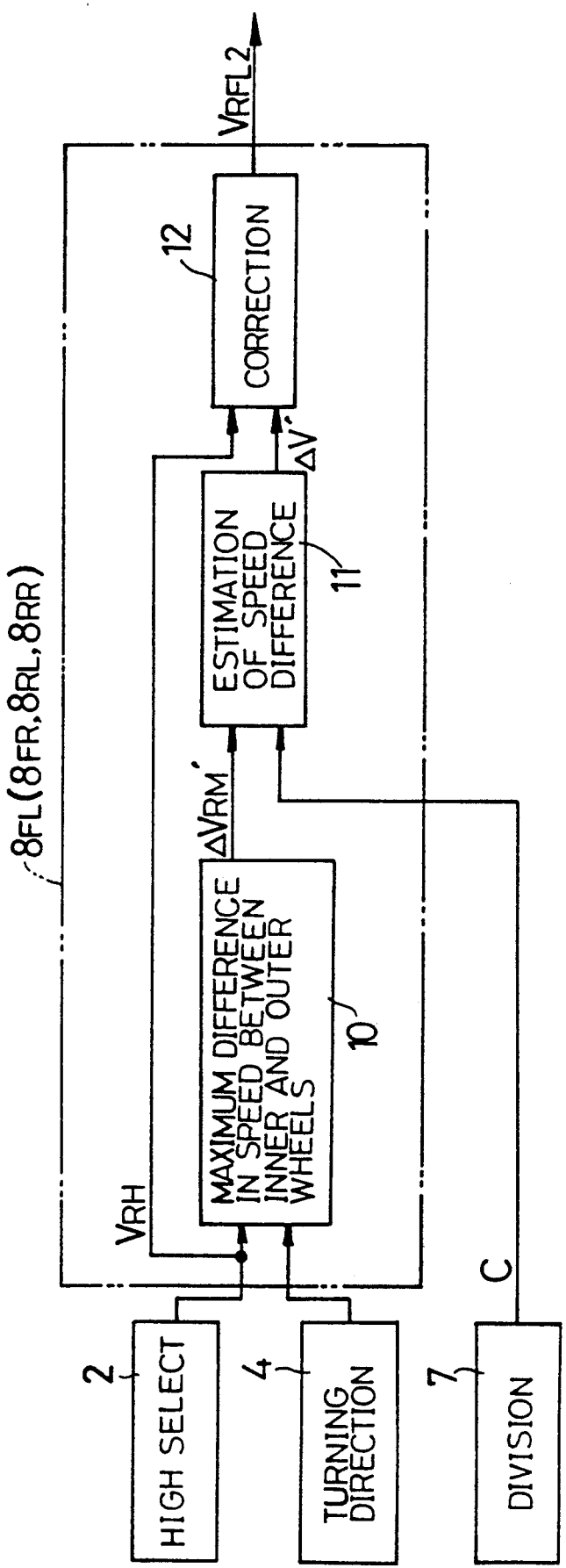

FIGS. 6 to 8 illustrate a third embodiment of the present invention.

The third embodiment of the present invention is shown as being applied to an anti-lock control system for a front wheel drive vehicle, which is designed to independently control the braking pressures for front wheels and to collectively control the braking pressures for rear wheels.

Referring to FIG. 6, a speed sensor $S_{FL}$ is mounted on the left front wheel of a front wheel drive vehicle; a speed sensor $S_{FR}$ is mounted on the right front wheel; a speed sensor $S_{RL}$ is mounted on the left rear wheel, and a speed sensor $S_{RR}$ is mounted on the right rear wheel. Wheel rotational Speeds $V_{WFL}$, $V_{WFR}$, $V_{WRL}$ and $V_{WRR}$ detected through the speed sensors $S_{FL}$, $S_{FR}$, $S_{RL}$ and $S_{RR}$ are supplied to speed arithmetic circuits $1_{FL}$, $1_{FR}$, $1_{RL}$ and $1_{RR}$ corresponding to the left and right front wheels and the left and right rear wheels.

In the speed arithmetic circuits $1_{FL}$, $1_{FR}$, $1_{RL}$ and $1_{RR}$, first vehicle body speeds $V_{RFL1}$, $V_{RFR1}$, $V_{RRL1}$ and $V_{RRR1}$ are calculated on the basis of the received wheel rotational speeds $V_{WFL}$, $V_{WFR}$, $V_{WRL}$ and $V_{WRR}$, a predetermined vehicle acceleration $(+G_{RA})$ and a predetermined deceleration $(-G_{RD})$. Specifically, in the speed arithmetic circuit $1_{FL}$, a first vehicle body speed $V_{RFL1(n)}$ is calculated, depending upon whether an acceleration or deceleration $((V_{RFL1(n-1)} - V_{WFL(n)})/\Delta T)$ obtained from a value resulting from subtraction of a current wheel rotational Speed $V_{WFL(n)}$ from the last value $V_{RFL1(n-1)}$ of the first vehicle body speed $V_{RFL1}$ of the last time divided by a time $\Delta T$ of a calculation cycle is within a range determined by the predetermined given acceleration $(+G_{RA})$ and deceleration $(-G_{RD})$.

That range is $-G_{RD} < (V_{RFL1(n-1)} - V_{WFL(n)})/\Delta T < +G_{RA}$, where $$V_{RTFL1(n)} = V_{RFL1(n-1)} - (V_{RFL1(n-1)} - V_{WFL(n)}) = V_{WFL(n)}$$

In addition, the range encompasses $(V_{RFL1(n-1)} - V_{WFL(n)})/\Delta T \leq -G_{RD}$, where $$V_{RFL1(n)} = V_{RFL1(n-1)} - G_{RD} \times \Delta T.$$

Further, the range includes $+G_{RA} \leq (V_{RFL1(n-1)} - V_{WFL(n)})/\Delta T$, where $$V_{RFL1(n)} = V_{RFL1(n-1)} + G_{RA} \times \Delta T.$$

This provides a first vehicle body speed $V_{RFL1}$ which is varied as shown in FIG. 7 with respect to the wheel rotational speed $V_{WFL1}$.

Even in the other speed arithmetic circuits $1_{FR}$, $1_{RL}$ and $1_{RR}$, a calculation similar to that in the above-described speed arithmetic circuit $1_{FL}$ is carried out, thereby providing first vehicle body speeds $V_{RFR1}$, $V_{RRL1}$ and $V_{RRR1}$, respectively.

The first vehicle body speeds $V_{RFL1}$, $V_{RFR1}$, $V_{RRL1}$ and $V_{RRR1}$ provided in the speed arithmetic circuits $1_{FL}$, $1_{FR}$, $1_{RL}$ and $1_{RR}$ are supplied to the high select circuit 2, where the largest value of these first vehicle body speeds $V_{RFL1}$, $V_{RFR1}$, $V_{RRL1}$ and $V_{RRR1}$ is selected as a first index representative of vehicle travel speeds.

The first vehicle body speeds $V_{RRL1}$ and $V_{RRR}'$, provided in the speed arithmetic circuits $1_{RL}$ and $1_{RR}$ corresponding to the left and right wheels which are driven or follower wheels, are also supplied to a subtraction circuit 3 and a high select circuit 5.

In the subtraction circuit 3, a subtraction according to $(V_{RRL1} - V_{RRR1}) = \Delta V$ is carried out. The value $\Delta V$ is a speed difference between the first vehicle body speeds $V_{RRL1}$ and $V_{RRR}'$, based on the wheel rotational speeds $V_{WRL}$ and $V_{WRR}$ of the left and right rear wheels and is used as a value corresponding to a turning amount during the turning of the vehicle. The braking pressures for the left and right rear wheels are collectively controlled, and the wheel rotational speeds $V_{WRL}$ and $V_{WRR}$ of the left and right rear wheels are varied synchronously, during both anti-lock control and non-antilock control. It is possible to provide a speed difference value substantially correctly as a value representative of the vehicle turning amount.

The speed difference $\Delta V$ as a turning amount-corresponding value provided in the arithmetic circuit 3 is supplied to a turning-direction judgement circuit 4. In the turning-direction judgement circuit 4, it is judged whether the vehicle has turned toward the right or left on the basis of the speed difference $\Delta V$ being positive or negative.

The high select circuit 5 selects the higher one of the vehicle body speeds $V_{RRL}'$, and $V_{RRR1}$ received therein and delivers the higher value of the vehicle body speeds $V_{RRL1}$ and $V_{RRR1}$ as a second index representative of the vehicle travel speeds $V_{RRH}$, which is received into a maximum turning-amount determination circuit 6.

In the maximum turning-amount determination circuit 6, a maximum speed difference $\Delta V_{RM}$, between the left and right wheel speeds is determined as a maximum turning-amount corresponding value in accordance with the second index $R_{RRH}$ on the basis of a minimum radius of turning of the vehicle being determined by the vehicle travel speed.

The maximum speed difference $\Delta V_{RM}$ as a maximum turning-amount corresponding value from the maximum turning-amount determination circuit 6 and the speed difference $\Delta V$ as a turning-amount corresponding value from the subtraction circuit 3 are received into a division circuit 7 where a ratio $C = (\Delta V / \Delta V_{RM})$ of an actual turning amount-corresponding value $\Delta V$ to the maximum speed difference $\Delta V_{RM}$ is calculated.

The speed $V_{RH}$ as the first index provided in the high select circuit 2, a turning-direction judgement result provided in the turning direction judgement circuit 4 and the ratio C provided in the division circuit 7 are received into the turning correction means $8_{FL}$, $8_{FR}$, $8_{RL}$ and $8_{RR}$ individually corresponding to the left and right front wheels and the left and right rear wheels.

The turning correction means $8_{FL}$ which corresponds to the left front wheel and is arranged as shown in FIG. 8 and comprises a maximum inner and outer wheel speed difference determination circuit 10, a speed difference estimating circuit 11 and a correction circuit 12.

The speed $V_{RH}$ as the first index from the high select circuit 2 and the turning-direction judgement result provided in the turning direction judgement circuit 4 are received into the maximum inner and outer wheel speed difference determination circuit 10 which determines a maximum inner and outer wheel speed difference $\Delta V_{RM}'$ in accordance with the first index representative of the travel speeds and the turning direction, on the basis of the minimum radius of turning of the vehicle being determined by the vehicle travel speed.

The maximum inner and outer wheel speed difference $\Delta V_{RM}'$ provided in the maximum inner and outer wheel speed difference determination circuit 10 and the ratio C provided in the division circuit 7 are received into a speed difference estimation circuit 11 which executes a calculation comprising a product of the maximum inner and outer wheel speed difference $\Delta V_{RM}'$ with the ratio C to produce an estimated inner and outer wheel speed difference $\Delta V' = (\Delta V_{RM}' \times C)$ or a calculation result.

The speed $V_{RH}$ provided in the high select circuit 2 and the estimated inner and outer wheel speed difference $\Delta V'$ provided in the speed difference estimation circuit 11 are received into the correction circuit 12. This circuit 12 executes a correction comprising a subtraction of the estimated inner and outer wheel speed difference $\Delta V'$ from the speed $V_{RH}$ to produce a second vehicle body speed $V_{RFL2} = (V_{RH} - \Delta V')$ as a calculation result.

The turning correction means $8_{FR}$, $8_{RL}$ and $8_{RR}$ corresponding to the right front wheel and the left and right rear wheels respectively are arranged in a similar manner to the arrangement of the turning correction means $8_{FL}$ corresponding to the left front wheel. Second vehicle body speeds $V_{RFL2}$, $V_{RFR2}$, $V_{RRL2}$ and $V_{RRR2}$ corresponding to the respective wheels are delivered from the turning correction means $8_{FL}$, $8_{FR}$, $8_{RL}$ and $8_{RR}$, respectively.

The first vehicle body speeds $V_{RFL1}$, $V_{RFR1}$, $V_{RRL1}$ and $V_{RRR1}$ provided in the speed arithmetic circuits $1_{FL}$, $1_{FR}$, $1_{RL}$ and $1_{RR}$ corresponding to the respective wheels as well as the second vehicle body speeds $V_{RFL2}$, $V_{RFR2}$, $V_{RRL2}$ and $V_{RR2}$ provided in the correction circuits 12 of the turning correction means $8_{FL}$, $8_{FR}$, $8_{RL}$ and $8_{RR}$ corresponding to the respective wheels are received into high select circuits $9_{FL}$, $9_{FR}$, $9_{RL}$ and $9_{RR}$ corresponding to the wheels, respectively. Each of the high select circuits $9_{FL}$, $9_{FR}$, $9_{RL}$ and $9_{RR}$ selects the higher one of the first vehicle body speed $V_{RFL1}$, $V_{RFR}'$, $V_{RRL}'$, or $V_{RRR}'$, and the second vehicle body speed $V_{RFL2}$, $V_{RFR2}$, $V_{RRL2}$ or $V_{RRR2}$ as an estimated vehicle body speed $V_{RFL}$, $V_{RFR}$, $V_{RRL}$ or $V_{RRR}$ for use in the anti-lock control of a corresponding wheel, respectively.

The operation of the third embodiment will be described below. A higher selected value of the first vehicle body speeds $V_{RFL1}$, $V_{RFR1}$, $V_{RRL1}$ or $V_{RRR1}$ based on the wheel rotational speeds $V_{WFL}$, $V_{WFR}$, $V_{WRL}$ or $V_{WRR}$ detected in the speed sensors $S_{FL}$, $S_{FR}$, $S_{RL}$ or $S_{RR}$ and the second vehicle body speeds $V_{RFL2}$, $V_{RFR2}$, $V_{RRL2}$ or $V_{RRR2}$ provided by the turning correction of the highest value of the wheel rotational speeds $V_{WFL}$, $V_{WFR}$, $V_{WRL}$ and $V_{WRR}$ detected in the corresponding speed sensors $S_{FL}$, $S_{FR}$, $S_{RL}$ and $S_{RR}$ is used as the estimated vehicle body speed $V_{RFL}$, $V_{RFR}$, $V_{RRL}$ or $V_{RRR}$ for use in the anti-lock control of a corresponding wheel, respectively. Therefore, even if a locking tendency is produced in an object wheel, resulting in a reduction tendency in the first vehicles body speed $V_{RFL1}$, $V_{RFR1}$, $V_{RRL1}$ or $V_{RRR1}$, it is possible to provide an increase in the accuracy of estimation of the vehicle body speed by using, as the estimated vehicle body speeds $V_{RFL}$, $V_{RFR}$, $V_{RRL}$, $V_{RRR}$, the second vehicle body speeds $V_{RFL2}$, $V_{RFR2}$, $V_{RRL2}$, $V_{RRR2}$ which are based on the rotational speeds of the corresponding wheels having a non-locking tendency other than the object wheel and which are provided by the correction of the turning.

Moreover, in correcting the turning, a difference $\Delta V$ between the vehicle body speeds based on the left and right rear wheel speeds is found, and the maximum inner and outer wheel speed difference $\Delta V_{RM}'$ determined on the basis of the speed $V_{RH}$ as the first index representative of the vehicle travel speeds and the turning direction is corrected by the ratio C of the speed difference $\Delta V$ to the maximum turning amount $\Delta V_{RM}$ determined using the second index $V_{RRH}$ representative of the vehicle travel speeds. This provides an estimated speed difference $\Delta V'$, and further, the speed $V_{RH}$ is corrected by the estimated speed difference $\Delta V'$ so as to provide the second vehicle body speeds $V_{RFL2}$, $V_{RFR2}$, $V_{RRL2}$ and $V_{RRR2}$. Therefore a sensor for detecting the vehicle turning amount is not required, and it is possible to provide a highly accurate correction of the turning and a higher accuracy estimation of the vehicle body speeds.

Further, the wheel rotational speeds $V_{WFL}$, $V_{WFR}$, $V_{WRL}$ and $V_{WRR}$ detected in the corresponding speed sensors $S_{FL}$, $S_{FR}$, $S_{RL}$ and $S_{RR}$ are corrected by the predetermined acceleration $(+G_{RA})$ and deceleration $(-G_{RD})$ so as to provide the first vehicle body speeds $V_{RFL1}$, $V_{RFR1}$, $V_{RRL1}$ and $V_{RRR1}$. Therefore, it is possible to provide a stable vehicle speed which is not governed by a rapid variation factor such as a locking tendency of each wheel.

In another alternative embodiment, it is possible to use an output from the high select circuit 5 rather than use the output from the high select circuit 2 as the first index representative of the vehicle speeds.

What is claimed is:

1. A method for estimating a vehicle body speed in an anti-lock control system for a vehicle for controlling the braking pressure for wheels by estimating the vehicle body speed on the basis of a wheel rotational speed detected in a speed sensor and judging a slip rate of the wheel on the basis of the estimated vehicle body speed, said method comprising the steps of:

calculating a first vehicle body speed on the basis of a wheel rotational speed detected in a speed sensor for an object wheel;

correcting the largest value of speeds based on wheel rotational speeds detected in speed sensors for all of wheels by a correction value based on a difference in speed between inner and outer wheels during turning of the vehicle to calculate a second vehicle body speed for the object wheel; and selecting a higher one of said first vehicle body speed and said second vehicle body speed as an estimated vehicle body speed for use in an anti-lock control for the object wheel.

2. A method for estimating the vehicle body speed in an anti-lock control system for a vehicle according to claim 1, wherein in obtaining the second vehicle body speed, a correcting value based on a difference in speed between inner and outer wheels during turning of the vehicle is determined in accordance with an index representative of a vehicle travel speed on the basis of the fact that a minimum radius of turning of the vehicle is determined by a vehicle travel speed.

3. A method for estimating the vehicle body speed in an anti-lock control system for a vehicle according to claim 1, wherein in obtaining the second vehicle body speed, the largest difference in speed between inner and outer wheels is determined in accordance with an index representative of a vehicle travel speed based on a maximum turning amount which is defined by a minimum radius of turning of the vehicle determined by a vehicle travel speed, and said largest difference in speed between the inner and outer wheels is corrected by a ratio of an actual turning amount to the maximum turning amount to calculate a correction value based on a difference in speed between the inner and outer wheels.

4. A method for estimating the vehicle body speed in an anti-lock control system according to claim 1, wherein an actual turning amount is found from a difference between higher one of speeds based on wheel rotational speeds detected in left and right wheel speed sensors which collectively control the braking pressures, and speed based on wheel rotational speeds detected in the left and right wheel speed sensors, thereby obtaining a correction value based on a difference in speed between inner and outer wheels during turning of the vehicle.

5. A method for estimating the vehicle body speed in an anti-lock control system according to claim 1, wherein the wheel rotational speed detected in the speed sensor is corrected by predetermined acceleration and deceleration, thereby obtaining a first vehicle body speed which is set such that the largest acceleration and deceleration are equal to said predetermined acceleration and deceleration.

6. A method for estimating a vehicle body speed in an anti-lock control system for a vehicle for controlling the braking pressure on each of the wheels by estimating the vehicle body speed based on a wheel rotational speed detected in a speed sensor and determining a slit rate of each wheel based on the estimated vehicle body speed, said method comprising the steps of:

calculating a first vehicle body speed based on wheel rotational speeds detected in speed sensors for each of a plurality of object wheels;

determining a highest speed value of the wheel rotational speeds detected in the speed sensors of the plurality of speed sensors;

correcting the highest speed value of speeds with a correction value based on a difference between an inner wheel speed and an outer wheel speed during turning of the vehicle;

calculating a second vehicle body speed for each of the plurality of object wheels based on the corrected highest speed value; and selecting a higher one of the first and second vehicle body speeds as an estimated vehicle body speed for use in anti-lock control of each of the plurality of object wheels.

7. A method for estimating the vehicle body speed in an anti-lock control system for a vehicle according to claim 6, wherein said step of correcting the highest speed value with a correction value includes the steps of determining an index representative of a vehicle travel speed and based on a minimum radius of turning of the vehicle as determined by a vehicle travel speed, and determining the correcting value in accordance with the vehicle travel speed index.

8. A method for estimating the vehicle body speed in an anti-lock control system for a vehicle according to claim 6, wherein said step of correcting the highest speed value with a correction value includes the steps of determining a largest difference between the inner and outer wheel speeds in accordance with an index representative of a vehicle travel speed based on a maximum turning amount which is defined by a minimum radius of turning of the vehicle determined by the vehicle travel speed, correcting the largest difference between the inner and outer wheel speeds by a ratio of an actual turning amount to a maximum turning amount, and calculating the correction value based on a difference between the inner wheel speed and the outer wheel speed.

9. A method for estimating the vehicle body speed in an anti-lock control system according to claim 8, wherein the step of correcting the largest difference between the inner and outer wheel speeds includes determining the actual turning amount based on a difference between the wheel rotational speeds detected in the speed sensors of left and right wheels of which the braking pressures are collectively controlled, and on the wheel rotational speeds detected in the left and right wheel speed sensors.

10. A method for estimating the vehicle body speed in an anti-lock control system according to claim 6, wherein said step of calculating the first vehicle body speed includes correcting the wheel rotational speeds detected in the speed sensors by a predetermined acceleration and a predetermined deceleration, the first vehicle body speed being set such that a largest acceleration and a largest deceleration are equal to said predetermined acceleration and deceleration, respectively.

11. A method for estimating a vehicle body speed in an anti-lock control system for a vehicle for controlling the braking pressure for wheels by estimating the vehicle body speed on the basis of a wheel rotational speed detected in a speed sensor and judging a slip rate of the wheel on the basis of the estimated vehicle body speed, said method comprising the steps of:

calculating first vehicle body speeds at least for a front wheel side and a rear wheel side, respectively, based on wheel rotational speeds detected in speed sensors for the vehicle wheels;

selecting a higher one of at least two wheels speeds derived from the front wheel side and the rear wheel side, respectively;

correcting said selected higher wheel speed by a correction value based on a difference in speed between inner and outer wheels during turning of the vehicle to calculate second vehicle body speeds at least for the front wheel side and the rear wheel side, respectively;

selecting a higher one of said first and second vehicle body speeds associated with respective wheels as an estimated vehicle body speed for the associated wheel to be used in an anti-lock control for the wheel.

* * * * *